(12) United States Patent
Kremers

(10) Patent No.: US 10,226,892 B2
(45) Date of Patent: Mar. 12, 2019

(54) METHOD FOR MANUFACTURING CONTINUOUS COMPOSITE TUBE, APPARATUS FOR MANUFACTURING CONTINUOUS COMPOSITE TUBE

(75) Inventor: Marcus Antonius Ivonne Kremers, Amsterdam (NL)

(73) Assignee: AO&G Holding B.V., IJmuiden (NL)

( * ) Notice: Subject to any disclaimer, the term of this patent is extended or adjusted under 35 U.S.C. 154(b) by 0 days.

(21) Appl. No.: 14/002,937

(22) PCT Filed: Mar. 5, 2012

(86) PCT No.: PCT/NL2012/050133
§ 371 (c)(1),
(2), (4) Date: Oct. 8, 2013

(87) PCT Pub. No.: WO2012/118378
PCT Pub. Date: Sep. 7, 2012

(65) Prior Publication Data
US 2014/0020819 A1 Jan. 23, 2014

(30) Foreign Application Priority Data

Mar. 3, 2011 (NL) ..................................... 2006335

(51) Int. Cl.
*B29C 53/56* (2006.01)
*B29C 63/00* (2006.01)
(Continued)

(52) U.S. Cl.
CPC ........ *B29C 53/566* (2013.01); *B29C 63/0069* (2013.01); *B29C 63/105* (2013.01);
(Continued)

(58) Field of Classification Search
CPC .............. B29C 53/566; B29C 63/0021; B29C 63/0069; B29C 63/105; B29C 70/086;
(Continued)

(56) References Cited

U.S. PATENT DOCUMENTS

| 2,467,999 A | 4/1949 | Stephens |
| 2,630,157 A | 3/1953 | Smellie |

(Continued)

FOREIGN PATENT DOCUMENTS

| CH | 350433 | 11/1960 |
| EP | 0154321 | 9/1985 |

(Continued)

OTHER PUBLICATIONS

Office Action from JP Application 2013-514132 dated Mar. 16, 2015.
(Continued)

*Primary Examiner* — Vishal I Patel
(74) *Attorney, Agent, or Firm* — Adsero IP

(57) ABSTRACT

Method for manufacturing a continuous composite tube comprising translating a tube liner through a manufacturing station wherein the manufacturing station comprises a winding station and a consolidation station located at a distance downstream of the winding station; winding a composite tape on the tube liner at the winding station for forming a tape layer; consolidating the composite tape on the tube liner at a consolidation zone of the consolidation station by pressing and heating to the tape.

5 Claims, 3 Drawing Sheets

(51) Int. Cl.

| | |
|---|---|
| *B29C 63/10* | (2006.01) |
| *B29C 70/08* | (2006.01) |
| *B29C 70/32* | (2006.01) |
| *B29C 70/38* | (2006.01) |
| *B29C 70/50* | (2006.01) |
| *B29D 23/00* | (2006.01) |
| *F16L 9/16* | (2006.01) |
| *F16L 9/12* | (2006.01) |
| *F16L 11/16* | (2006.01) |
| *B29C 53/68* | (2006.01) |
| *B29L 23/00* | (2006.01) |

(52) U.S. Cl.
CPC ............ *B29C 70/086* (2013.01); *B29C 70/32* (2013.01); *B29C 70/386* (2013.01); *B29C 70/50* (2013.01); *B29D 23/001* (2013.01); *F16L 9/12* (2013.01); *F16L 9/16* (2013.01); *F16L 11/16* (2013.01); *B29C 53/68* (2013.01); *B29C 63/0021* (2013.01); *B29L 2023/22* (2013.01); *Y10T 137/0318* (2015.04)

(58) Field of Classification Search
CPC ....... B29C 70/32; B29C 70/386; B29C 70/50; B29C 53/68; F16L 11/16; F16L 9/16; F16L 9/12; B29D 23/001; B29L 2023/22; Y10T 137/0318
USPC .................. 156/187, 188, 184, 171, 172
See application file for complete search history.

(56) References Cited

U.S. PATENT DOCUMENTS

| | | | |
|---|---|---|---|
| 2,731,067 A | 1/1956 | Miller | |
| 3,148,102 A | 9/1964 | Eakins | |
| 3,457,962 A | 7/1969 | Shobert | |
| 3,494,812 A | 2/1970 | Cvacho | |
| 3,530,901 A | 9/1970 | Richardson | |
| 3,531,357 A | 9/1970 | Heckly | |
| 3,567,542 A | 3/1971 | Jackson | |
| 3,769,127 A | 10/1973 | Goldsworthy | |
| 4,020,202 A | 4/1977 | Kreft | |
| 4,058,427 A | 11/1977 | Wilson | |
| 4,151,031 A | 4/1979 | Goad | |
| 4,385,952 A | 5/1983 | Futakuchi | |
| 4,734,146 A | 3/1988 | Halcomb | |
| 4,790,898 A | 12/1988 | Woods | |
| 4,867,824 A | 9/1989 | Gill | |
| 4,877,193 A | 10/1989 | Vaniglia | |
| 4,891,179 A | 1/1990 | Peacock | |
| 4,943,334 A | 7/1990 | Medney | |
| 5,261,991 A | 11/1993 | Zackrisson | |
| 5,435,868 A | 7/1995 | Yu | |
| 5,587,041 A | 12/1996 | Sandusky | |
| 6,047,756 A | 4/2000 | Uchida | |
| 6,782,932 B1 | 8/2004 | Reynolds | |
| 7,238,250 B2 | 7/2007 | Kindervater | |
| 2001/0039700 A1 | 11/2001 | Krueger | |
| 2002/0119271 A1 | 8/2002 | Quigley | |
| 2003/0209312 A1* | 11/2003 | Hauber | B29C 53/68 156/172 |
| 2005/0258575 A1 | 11/2005 | Kruse et al. | |
| 2007/0175573 A1* | 8/2007 | Fox | B29C 70/34 156/196 |
| 2009/0250134 A1* | 10/2009 | Slagsvold | F16L 11/081 138/137 |
| 2010/0062249 A1 | 3/2010 | Harazono et al. | |

FOREIGN PATENT DOCUMENTS

| | | | |
|---|---|---|---|
| EP | 0198744 | 10/1986 | |
| EP | 0265915 | 5/1988 | |
| EP | 0355308 | 2/1990 | |
| EP | 0423954 | 4/1991 | |
| EP | 0423954 A1 * | 4/1991 | ........... B29C 33/065 |
| EP | 0463611 | 1/1992 | |
| EP | 0535264 | 4/1993 | |
| EP | 1118450 | 7/2001 | |
| FR | 2389060 | 11/1987 | |
| GB | 1291729 | 10/1972 | |
| GB | 1 485 586 | 1/1975 | |
| JP | U56066423 | 4/1981 | |
| JP | A57069023 | 4/1982 | |
| JP | A61002540 | 1/1986 | |
| JP | 6316718 A | 7/1988 | |
| JP | A05031810 | 2/1993 | |
| JP | A11111893 | 4/1999 | |
| WO | 98/03326 | 1/1998 | |
| WO | WO 98/38030 | 9/1998 | |
| WO | WO 2004/007179 | 1/2004 | |
| WO | WO 2005/108046 | 11/2005 | |
| WO | 2006/107196 | 10/2006 | |
| WO | WO 2006107196 A1 * | 10/2006 | ........... B29C 53/566 |

OTHER PUBLICATIONS

International Search Report from PCT/NL2011/050413 dated Sep. 2, 2011.
International Application No. PCT/NL2012/050134; International Preliminary Report on Patentability; dated May 13, 2013; 5 pages.
International Application No. PCT/NL2012/050133; International Preliminary Report on Patentability; dated Sep. 12, 2013; 8 pages.
International Search Report from PCT/NL2006/000177 dated Aug. 22, 2006.
Office Action from U.S. Appl. No. 14/002,944 dated May 31, 2016.
Office Action from U.S. Appl. No. 14/002,944 dated Feb. 8, 2017.
Office Action from U.S. Appl. No. 13/702,552 dated Nov. 2, 2016.
Office Action from U.S. Appl. No. 13/702,552 dated Apr. 27, 2017.
Notice of Allowance from U.S. Appl. No. 13/702,552 dated Sep. 19, 2017.
Office Action from U.S. Appl. No. 14/002,944 dated Jun. 26, 2017.
Office Action from U.S. Appl. No. 14/002,944 dated Dec. 19, 2017.
Notice of Allowance from U.S. Appl. No. 14/002,944 dated Jul. 24, 2018.
Office Action from U.S. Appl. No. 14/002,944 dated Nov. 10, 2015.

* cited by examiner

METHOD FOR MANUFACTURING CONTINUOUS COMPOSITE TUBE, APPARATUS FOR MANUFACTURING CONTINUOUS COMPOSITE TUBE

The invention relates to a method for manufacturing a continuous composite tube, more specific a thermoplastic composite tube.

Tubes with a long length are known and are often used in subsea or subsurface applications or as overland flowlines, though the application is not limited thereto. A continuous tube is for example preferably used in exploration, production, intervention and drilling applications, onshore and offshore, whereby the largest benefits may be found offshore. Such applications may often require lengths of several hundreds of meters up to several kilometers pipe.

Steel pipes are commonly used, which however have disadvantages such as corrosion, fatigue, yielding, weld sensitivity, weight, etc. Also, transport of a relatively long length steel pipe by means of coiled tubing can be difficult. Further, for manufacturing of long length steel pipes, different sections of steel pipe are usually welded together, which may be a time consuming manufacturing process wherein the weld line may result in a weak spot of the pipe.

Therefore, an attempt has been made to produce composite tubes of a relatively long length. Different technologies are known, such as braiding or filament winding etc. to produce a composite pipe, either in sections or in a more or less continuous process.

It is known that there are several methods to manufacture composite pipe in a long length (continuous pipe). For example, a production line of winding machines is used that wind dry fibres or a pre-impregnated prepreg tape of fibre and resin onto the liner or previous layer, to build up a laminate of various layers of tape or fibre. The structure of the composite pipe can either be unbonded, in which the structural elements are loose and not structurally connected to each other, or so-called bonded, in which the elements are structurally connected and form a solid structure. Furthermore, the structure of the composite pipe can be based on a thermoset or thermoplastic polymer.

Significant pre-tension on the tape and/or the fibres in the tape might be used to provide consolidation pressure during curing for thermoset composite or consolidation for thermoplastic composite. After creating the laminate, the laminate is cured or consolidated by applying heating. For unbonded pipe the curing or consolidation by heating may be ommitted, and the loose layers can be used as-is or covered by an extruded layer of polymer.

Drawbacks of the known composite pipes are for example limited external pressure resistance for unbonded pipe, microcracking for thermoset pipe, limited impact resistance for thermoset pipe, limited chemical resistance, limited resistance to rapid gas decompression, limited spoolability for bonded thermoset pipes, limited internal pressure strength, etc.

Moreover, these conventional processes may require the product to be manufactured in a single production step. Also, conventional manufacturing processes impose a limit on the time period to manufacture the pipe in case of a thermoset laminate and/or a limit on the production speed. Further, the conventional processes usually require a complex production machinery.

In addition, a relatively high tension may be required which may result in tape and/or fibre rupture while applying pretension on the tape and/or the fibres and may result in relatively high residual stresses in the pipe. The use of pre-tension during the manufacturing process implies using a relatively high winding angle for the fibres and/or the tape. The pre-tension during the process can induce torsion load onto the liner or substrate which can deform the pipe and can have a negative effect on the quality and/or the mechanical strength of the pipe.

Further, it is known that for the manufacturing of consolidated thermoset or thermoplastic pipes or laminates, tape placement or fibre placement processes can be used in which no or limited pre-tension is used. In the area where the tape is applied to the product, called the nip-point area, a pressure body such as a roller or a shoe is used to apply pressure to the laminate in order to consolidate the tape to the substrate at the nip-point area.

An example for the manufacturing of continuous thermoplastic composite pipe is described in WO 2006/107196. Publication WO 2006/107196 describes an apparatus for manufacturing a fibre-reinforced tube. The tape is wounded around the tube liner while the tape is pressed onto the tube liner at the nip point by a pressure roller. So, the tape is simultaneously wound and pressed onto the tube liner. Optionally, heating of the tape at the nip point may be applied. A next tape layer can be wound and pressed onto a previously wound tape layer. However, drawbacks of this method are for example the low quality of resulting product, the complex machinery and the still limited processing speed.

Due to these drawbacks, the conventional composite pipes are not widely used in especially offshore, subsea, downhole, drilling and high-pressure applications.

An object of the invention is to provide a method for producing a composite tube in a relatively long length that obviates at least one of the above mentioned drawbacks.

Thereto, the invention provides a method for manufacturing a continuous composite tube according to claim 1.

The current invention relates to a process primarily to make bonded pipe. A bonded or consolidated laminate has better mechanical performance, has the capability to withstand compression loads such as external pressure, handle combined and off-axis load cases and is better resistant to rapid gas decompression.

The present invention is primarily used to manufacture thermoplastic composite pipe, although the use of thermoset composite material is also possible. Another possibility is to use dry fibre tows, to manufacture a dry fibre preform that is infused with a polymer resin in a subsequent manufacturing step. The advantage of using thermoplastic composite for a long continuous pipe with a consolidated, bonded laminate is the higher ductility and allowable strain of the material, providing impact resistance, spoolability, residual strength and toughness.

With the method according to the invention, a continuous consolidated thermoplastic composite pipe can be manufactured. Such a bonded pipe has better resistance to external pressure, better internal pressure strength, ability to withstand loads that are off-axis to the fibre direction, better spoolability than thermoset composite pipe. If the liner, composite and possibly coating material are made from the same thermoplastic polymer, all layers can be weld-fused together providing a pipe system that has better resistance to rapid gas decompression than conventional composite pipes that are either unbonded or combine different materials in the pipe resulting in lower interface strength between the different materials.

For example, a pipe can be manufactured using a one material concept, meaning that the matrix material of the tape can be the same or similar to the material of the tube liner, and the same of the outer coating, resulting in better fusing and consolidating, thus better performance.

By first winding the tape onto the tube liner and then, downstream of the winding station, consolidating the tape onto the tube liner, the tube can be manufactured in a predictable and controlled manner. Since winding and consolidating of the tape are spatially separated along the longitudinal axis of the tube liner, in a separate winding station and a separate consolidation station, both processes can be performed independently of one another and therefore can be better controlled. In fact, the consolidation of the tape is decoupled from the winding of the tape. In addition, by separating the winding station and the consolidation station, a more simple apparatus can be obtained, which may be relatively compact. Such a more simple apparatus can be more reliable, relatively easy to maintenance and may therefore be more cost effective.

By consolidating the tape onto the tube liner, the tape is simultaneously and at the same location pressed and heated to the tube liner or a previously wound tape layer, while the tube liner is being translated. The pressure and the heat are applied at the same location and at the same time to at least the tape while the tube is being translated. At least the tape layer is pressed and heated to bond to the tube liner or to a previously wound tape layer. Advantageously, also the underlying tube liner, or a previously wound tape layer, may be heated somewhat to improve the bonding, i.e. the heating may be such that not only the upper and latest wound tape layer is heated but also an upper part of the underlying previously wound tape layer is heated to improve bonding. Optionally, the tube liner and/or previously wound tape layer, may be pre-heated.

The process is preferably a continuous process so that the tube liner is being translated while the pressure and heat is applied simultaneously and at the same location. The devices applying the pressure and heat, a pressure device and a heat device, advantageously are stationary with respect to the translating tube. Since the tube liner can translate during the application of the pressure and the heat, a continuous tube of a relatively long length can be obtained. The tube length is preferably larger than 20 m, more preferably larger than 50 m, more preferably larger than 100 m. The composite tube can even have a length of one kilometer or several kilometers. Alternatively, the translation of the tube is stopped for consolidating a certain area, after which the tube is translated further to consolidate a next area, so the process becomes a stop-go process.

Further, by using a tube liner, a mandrel for manufacturing the composite tube may be omitted. The tape is wound directly onto the tube liner and is thereafter consolidated to the tube liner to form an integrated layer with the tube liner. Further tape layers may be wound and consolidated on the previous tape layer on the tube. Because no mandrel is needed, there is no limit to using multiple winding and consolidation stations. In conventional pulltrusion processes, or in the conventional Drostholm continuous filament winding process, a mandrel is used that is supported on one side, within the manufacturing station. In such processes, only one manufacturing station can be used. Also, the process according to the invention can be repeated by repeating the production process, for example by translating the pipe another time through the manufacturing station. Therefore, the process poses no limit to the thickness of the composite laminate and the process can be scalable, depending on the required thickness.

A continuous composite tube may be obtained, so joints to connect discrete sections of tube can be omitted and/or minimalized, and the installation and/or operation may be implemented faster.

The tube liner may be understood to be a plastic tube liner and/or a composite tube comprising already of consolidated tape layers. A composite tape is understood to comprise a fibre-reinforced plastic tape.

In addition, by consolidating the tape onto the tube liner by applying external pressing and heating to the tape and/or the tube and/or the tube liner simultaneously and at the same location, the tape can be laid onto the tube liner with very few or approximately no pretension in the tape and/or in the fibres of the tape. At least pressing and heating is applied to the tape layer, but also the tube and/or the tube liner may be subject to the pressing and heating. So, better mechanical performance may be obtained than according to a prior art method where heating of the tape is done independent of providing pressure. In some prior art methods, pressure is usually provided by pretensioning the tape during winding of the tape onto the tube. Afterwards, heat is applied for consolidation. Since pretensioning of the fibres in the tape may result in residual stresses in the pipe after consolidation, the mechanical performances may be less than a pipe manufactured according to the invention.

Optionally, at the consolidation zone also cooling may be applied to the tape layer and/or laminate to freeze the laminate. The consolidation zone may then for example comprise of first pre-heating, then simultaneous pressing and heating and then cooling. First, pre-heat may be applied to at least partly warming the tape in a pre-heating zone, then pressure may be applied simultaneous and at the same location with heat to fuse the tape layer to the previous tape layer in a pressure zone. Thereafter, there may be cooled to freeze the fused tape layer in a cooling zone. By providing additionally cooling, the production speed may be increased. Alternatively, following a consolidation zone, a cooling zone providing cooling only, may be arranged. In a consolidation zone at least pressure and heat are applied simultaneously and at the same location. Providing a pre-heating zone and/or a cooling zone is optionally.

Also, optionally, multiple consolidation zones may be applied. Each consolidation zone comprises simultaneous and at the same location heating and pressing, optionally cooling. Consolidation zones may be mutually different in at least the provided pressure and/or temperature. For example, the temperature and/or pressure may be increased from one consolidation zone to another consolidation zone.

Also, by winding the tape with limited pretension, various winding angles may be possible and the tape may even be laid onto the tube liner with an angle of approximately 0° with respect to the axial axis of the tube liner. So, improved mechanical performance of the composite tube may be obtained.

The pressure is provided on an area of the tube liner and/or the pipe. Since, in particular when using a thermoplastic unreinforced tube liner, applying the pressure over an area avoids using a high local pressure could possibly result in damage or collapse of the liner. This collapse risk may be increased with the heat that needs to be applied at the consolidation area, which will lower temporarily the strength and/or stiffness of the unreinforced liner. This is contrary to the prior art methods, such as fibre placement, in which a roller or a shoe is used at the nip-point, where the tape makes contact with the liner tube. In such processes only a very local, line-type contact is used. This results in a small area on which pressure can be applied. To provide high enough consolidation force, high pressures are used.

Advantageously, during consolidating, the tape is pressed and simultaneously heated over an axial length of the tube onto the tube liner, so the area over which the pressing occurs can be relatively large to provide a thorough consolidation and/or to provide an increased processing speed contrary to the prior art where consolidation is done over a line or a small consolidation area, usually at or near the nip-point line, e.g. with a roller or a shoe pressing on the tape and laminate. The manufacturing performance may increase since consolidation of the tape layer onto the tube liner can be done in a relatively large consolidation area over an axial length of the tube, which can be much longer than in the conventional methods.

In fact, the orientation of the consolidation area is decoupled from the tape orientation, whereas according to the prior art the small consolidation area at or near the nip-point line has the same orientation as the tape, approximately perpendicular to the direction of the tape. This way, the length of the consolidation area can be increased, which may reduce the required pressure for a given production speed and makes it possible to consolidate without a mandrel, on a relatively flexible tube liner.

A further advantage is that the consolidation pressure body is only dependent on the pipe diameter, and not on the winding angle, as is the case in the conventional method in which a pressure body is used perpendicular to the tape direction. The consolidation station may be relatively easily scaled for different pipe diameters, a large pipe diameter only requires a larger size e.g. diameter of at least the pressure body.

Advantageously, the consolidation area also comprises a substantial circumferential section of the tube, which may be referred to as axial-circumferential consolidation. In a preferred embodiment, the consolidation area extends over approximately the complete circumference of the tube liner and over a predetermined axial length of the tube, creating a relatively large consolidation surface. The tape layer can be consolidated over the complete outer surface of the tube liner over the whole circumference of the tube and an axial length, which may increase the processing speed more. It also ensures that all parts of the tape layer are consolidated, and that no areas of unconsolidated material can occur.

By using a pressure body, in particular a flexible pressure body, for pressing the tape onto the tube liner, the tape can be pressed onto the tube liner over a relatively large surface area in axial and/or circumferential direction. In addition, a flexible pressure body can easily adapt to the increasing tube diameter, which becomes larger with every tape layer wound upon until a predetermined tube diameter is obtained.

Preferably, pressurizing the tape onto the tube liner is force controlled, so preferably, the pressure body is force controlled, contrary to a geometry controlled pressure body. A force controlled pressure body can accommodate irregularities on the tube liner and/or an irregular tube liner, e.g. an oval tube liner due to spooling. A geometry controlled pressure body would for example be a solid die with a fixed geometry for the opening, which, if an irregular tube liner is used, results in different pressures along the circumference of the pipe, resulting in a pipe of inferior quality. A force controlled pressure body can be a flexible pressure body, a geometry controlled pressure body mounted on a force-controlled mechanism such as springs or actuators, or may comprise a vacuum between the pipe and the pressure body to generate the contact pressure.

By providing internal pressure in the tube liner during consolidating, the external pressure applied by the pressure body may be applied more effectively. Furthermore, the internal pressure can decrease the ovalisation of the tube liner that occurs due to spooling of the pipe.

For consolidating the tape onto the tube liner, the tape is pressed and heated at the consolidation zone simultaneously and at the same location to obtain an optimal consolidation or welding of the tape to the tube liner. Cooling can be used to lower the temperature below the melt-point of thermoplastic resin and freeze it.

According to the invention, heating is done in the consolidation zone simultaneously with pressing at a distance downstream from the winding station. Heating can be done indirectly, e.g. via infrared, gas, hot air, induction, laser, micro-wave, or directly, via contact heating. Preferably, the tape is heated by contact heating to minimize losses and to maximize heat exchange between the heating device and the tape.

Advantageously, the pressure body is heated by a heating device and provides the contact heating for heat transfer to the pipe during contact with the pipe while pressurizing. During pressing of the pressure body, the heat can be transferred to the tape to melt the tape and/or components of the tape for consolidating the tape layer onto the tube liner. By heating the pressure body, pressure and heat can advantageously be applied at the same time and at the same location to the tape and/or tube.

Further, cooling can be used to consolidate the laminate under pressure. Also for cooling, contact is preferably used to provide an optimal heat exchange. Multiple consolidation zones with different pressures and temperatures, either for heating or cooling, might be used in the consolidation station.

Adhesion of the tape onto the tube liner and/or a previous tape layer is usually obtained without the application of an adhesive interface layer. Additionally to heating at the consolidation zone, pre-heating may be considered at or upstream of the consolidation zone.

At the nip-point area, the use of a local roller or shoe can be used to aid the first consolidation of the tape to the tube liner, in combination with the aforementioned consolidation zone for pressing and heating downstream of the winding station. The nip-point area is usually situated at the winding station.

The tape can be wound spirally with an angle with respect to the longitudinal direction of the tube liner, onto the tube liner, but the tape can also be laid axially at an angle of approximately 0° onto the tube liner, since the tape is wound onto the tube liner with minimal or approximately no pretension in the tape.

Advantageously a further tape layer is wound onto the tube liner. So, a plurality of tape layers can be wound on the tube liner for producing a composite tube. After having wound each tape layer, the tape layer can be consolidated. Also, a few tape layers can be wound onto each other and these few tape layers can then be consolidated at once. Preferably, each tape layer is consolidated individually. Alternatively, a few, maximum six, tape layers may be wound and consolidated together. Contrary to the prior art methods, not all tape layers are wound beforehand and are then, all at once, consolidated. According to the invention, preferably each tape layer, alternatively a few tape layers, is wound and is then consolidated. After consolidation of the previous tape layer, the next tape layer is wound and consolidated. By translating the tube a further time through the manufacturing station for winding and consolidating a further tape layer onto a previously wound tape layer, a relatively strong tube may be obtained, since each tape layer is individually consolidated and bonded to a previously wound and consolidated tape layer.

If a tape layer is wound and consolidated onto a previous consolidated tape layer, the tube already has a certain mechanical performance and rigidity, and may already be loaded during production, e.g. the tube may be spooled between each tape layer. It is not required to first manufacture the full pipe before the pipe can be spooled. The complete pipe may thus be manufactured in several steps. After the first translation step of winding and consolidating a tape layer onto the tube liner, in a further translation step a further tape layer can be wound and consolidated onto a previous tape layer. By repeating the further translation step until sufficient or a predetermined number of tape layers have been laid, the continuous tube end product can be obtained. The process may be scalable, with a single manufacturing station multiple tape layers may be laid and a full end product can be made. In addition, by using the method and apparatus according to the invention, a single manufacturing station may be used for manufacturing continuous tubes of different diameters and is thus flexibly usable.

In an embodiment, the tube liner and/or the tape is of thermoplastic material and/or comprises thermoplastic material for improving adhesion of the tape to the tube liner and/or for improved flexibility characteristics of the tube. Analogously, the tape and/or the tube liner may be of thermoset material, or in a dry fibre form, possible stabilized with binder powder.

The invention further relates to an apparatus for manufacturing a continuous composite tube. The apparatus comprises a separate winding station and a separate consolidation station. In the winding station the tape is wound onto the tube liner to form a tape layer. In the consolidation station, the tape layer is consolidated onto the tube liner by simultaneously pressing and heating of the tape layer at the same location, i.e. the pressure and the heat are applied to the tape layer at the same location while the tube liner is being translated.

A separate pressure device and a separate heating device may be provided which are arranged such that at the same location the pressure and heat can be applied simultaneously. Alternatively and/or additionally, the pressure device may be heated to provide for simultaneous and at the same location pressure and heat. Further advantageous embodiments are represented in the dependent claims.

The invention will further be elucidated on the basis of exemplary embodiments which are represented in a drawing. The exemplary embodiments are given by way of non-limitative illustration of the invention.

In the drawing.

It is noted that the figures are only schematic representations of embodiments of the invention that are given by way of non-limiting example. In the figures, the same or corresponding parts are designated with the same reference numerals.

Figure 1:
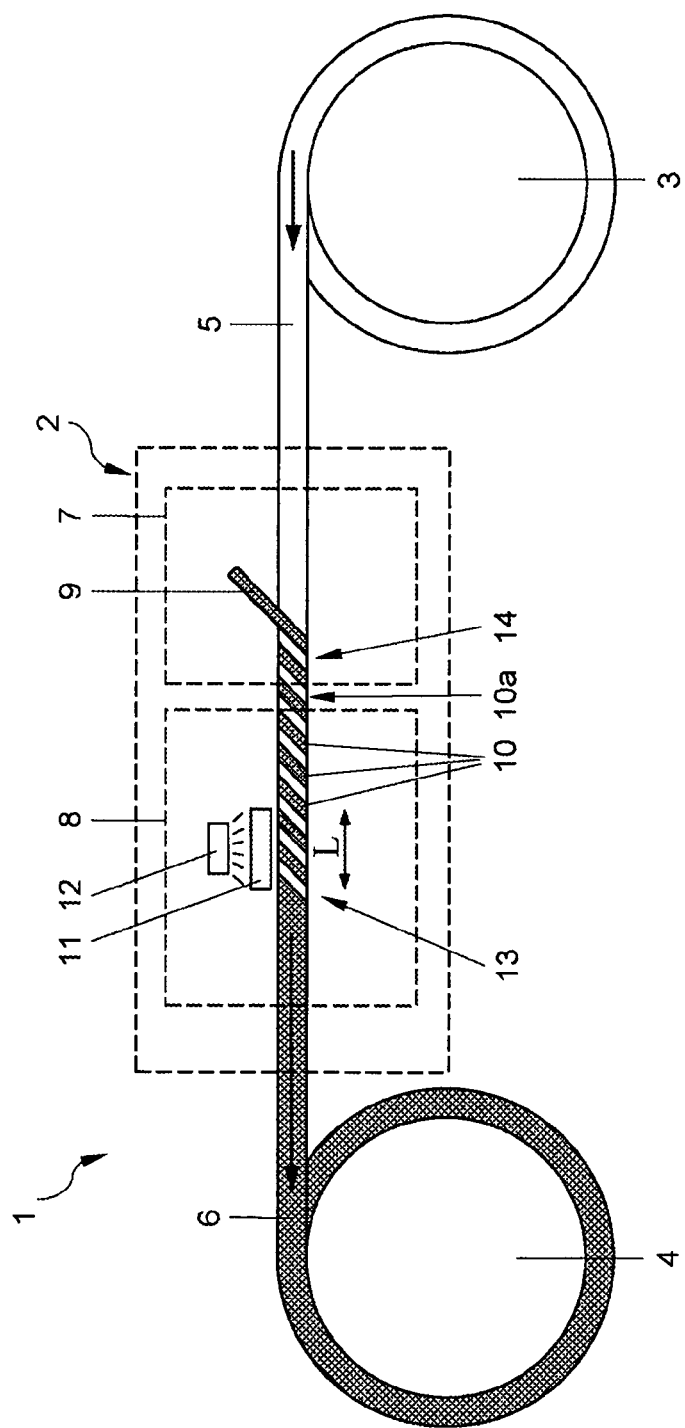
FIG. 1 shows a schematic representation of a first embodiment of an apparatus according to the invention.

FIG. 1 shows a schematic representation of an apparatus 1 according to the invention. The apparatus 1 for manufacturing a continuous composite tube comprises here a manufacturing station 2 and two reels 3, 4. A plastic, preferably thermoplastic, tube liner 5 is coiled onto the reel 3. During manufacturing of the composite tube 6, the tube liner 5 is translated through the manufacturing station 2 and coiled onto the reel 4. Thus a composite coiled tube 6 can be realized.

The manufacturing station 2 comprises a separate winding station 7 and a separate consolidation station 8. At the winding station 7 a composite, preferably thermoplastic, tape 9 is laid over the tube liner 5 to form a tape layer on the tube liner 5 at the winding zone 14. The tape can be a fibre reinforced tape. The tape 9 can be laid in paths 10 approximately next to each other forming a tape layer 10a. A small gap between the tape paths 10 is acceptable or a small overlap between the tape paths 10 is acceptable. Ideally, the tape paths 10 abut against each other.

At a distance downstream of the winding station 7, the consolidation station 8 is positioned. At the consolidation station 8, the tape layer 10a is consolidated on the tube liner 5 by simultaneously and at the same location pressing and heating. The simultaneous pressure and heat is provided at the same location, here in the consolidation zone 13, while the tube liner 5 is being translated through the consolidation station 8. The pressing and heating of the tape layer 10a is done at the same location and at the same time at the consolidation zone 13 so an optimal fusing of the tape layer 10a to the tube liner 5 can be obtained. By providing the consolidation of the tape layer 10a on the tube liner 5 at a distance downstream of the winding zone 14, a controlled process may be obtained.

Figure 2:
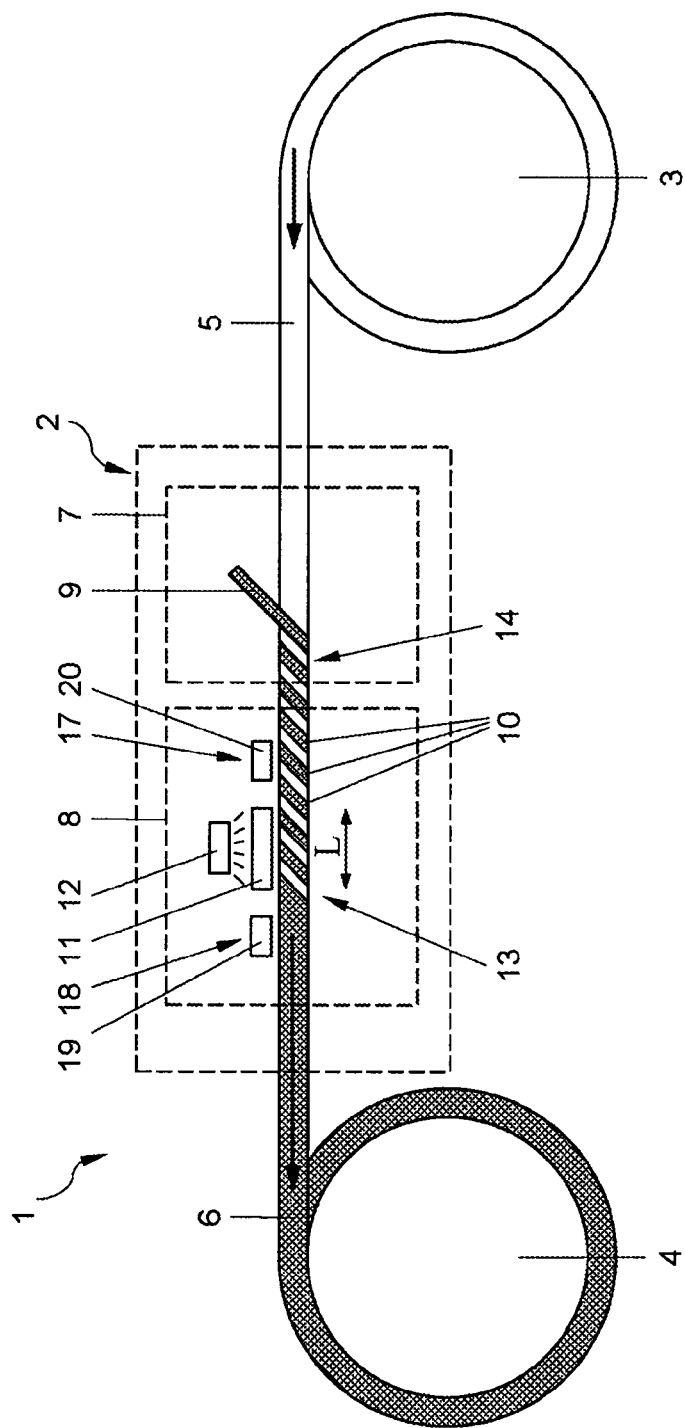
FIG. 2 shows a schematic representation of a second embodiment of an apparatus according to the invention.

FIG. 2 shows another embodiment of the invention, in which further a cooling zone 18 and a pre-heating zone 17 are provided. At the cooling zone 18 a cooling device 19 is arranged, and at the pre-heating zone 17 a pre-heating device 20 is arranged. First, there can be pre-heated to at least partly melting the tape layer 10a in a pre-heating zone 17, then pressure and heat are applied in the consolidation zone 13 to fuse the tape layer 10a to the previous layer. Thereafter, there may be cooled to freeze the fused tape layer 10a in the cooling zone 18. Also, multiple consolidation zones 13 may be provided e.g. in the same consolidation station or in multiple consolidation stations. Many variants are possible.

Figure 3:
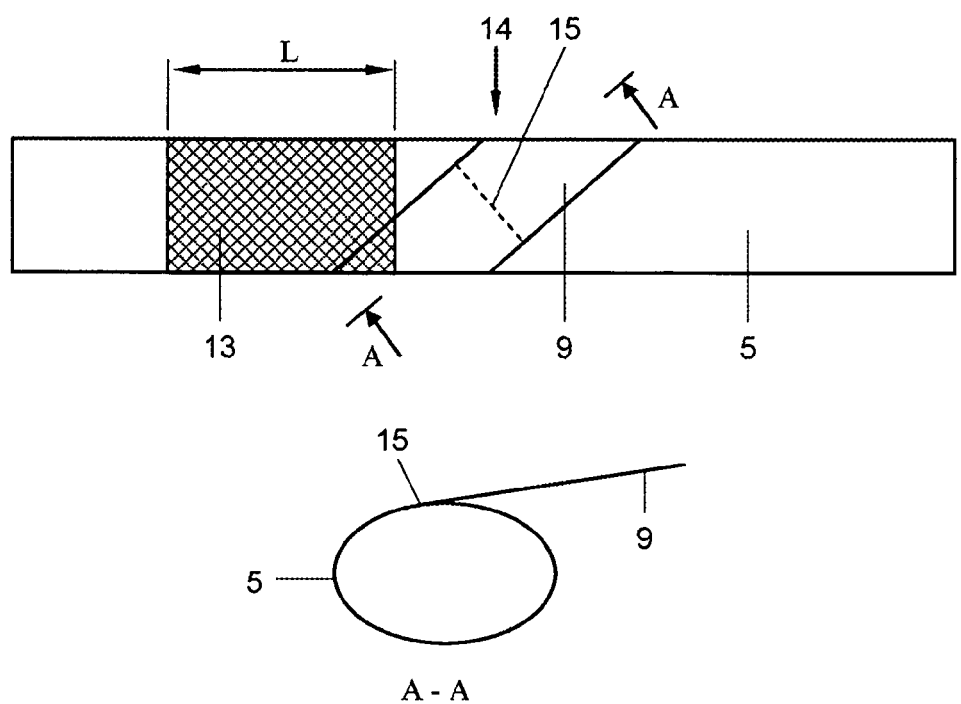
FIG. 3 shows a schematic representation of physical separation of winding and consolidating of the tape.

For consolidating the tape layer 10a onto the tube liner 5, a pressure body 11 and a heating device 12 is provided. In the examples shown in FIG. 1 and FIG. 2, the pressure body 11 is stationary with respect to the tube and/or the tube liner and/or the tape. Also, in the embodiments shown, the heating device 12 is stationary with respect to the tube and/or the tube liner and/or the tape. FIG. 3 shows that the consolidation takes place at a consolidation zone 13 at a distance downstream of a winding zone 14. At the winding zone 14, the tape 9 is wound onto the tube liner 5, the point where the tape 9 contacts the tube liner 5 is usually referred to as the nip-point line 15. Decoupled from the winding of the tape 9, is the consolidation of the tape 9 that takes place at the consolidation zone 13 of the consolidation station 8. Consolidating the tape 9 onto the tube liner 5 by simultaneous and at the same location pressing and heating is preferably done over a consolidation area that extends over an axial length L of the tube liner 5, and preferably, over the circumference of the tube liner 5. Depending on the configuration of the pressure body, the consolidation area, i.e. the outer surface of the tube liner on which the pressure and heat is applied, extends over a part of the circumference or over the complete circumference of the tube liner.

The pressure is preferably applied over an axial length of the tube liner and/or over a circumferential part of the tube liner. Advantageously, during pressing with the pressure device, the tube liner 5 is internally pressurized as well to minimize the risk of collapsing of the tube liner 5.

While applying pressure in the consolidation area, there is also at the same time and at the same location heating. The heating may be provided by a heating device 12 that may heat the tube liner directly, for example that the heating device 12 heats the tape and/or the tube liner, or indirectly, for example the heating device 12 heats the pressure body 11 which in turn heats the tape and/or tube liner. Heating devices may be positioned stationary with respect to the tape and/or the tube liner. Also, a heating device may be combined with a pressure device, e.g. a heated shoe that can apply pressure onto the tape and/or the tube liner.

The heating is preferably done over an axial length of the tube liner and/or over a circumferential part of the tube liner. Preferably, the area heated is approximately the same as the area that is pressed on. By heating the tube liner 5 and/or the tape 9, the fusing of the tape 9 to the tube liner 5 can be improved.

Preferably, the tube liner 5 and/or the tape 9 are heated by contact heating, to increase the heat exchange to the tape and/or the tube liner and to improve the fusing between the tape 9 and the tube liner 5. Advantageously, the pressure body 11 itself is heated. By pressing the heated pressure body 11 onto the tape 9 and the tube liner 5, the tape 9 and the tube liner 5 are heated. In a similar way, cooling can be realised.

Manufacturing of the composite tube is preferably a continuous process, meaning that during translation of the tube liner 5 through the manufacturing station 2, the tape 9 is consolidated on the tube liner 5. During consolidation, the pressure body 11 is stationary and in contact with the tape 9 for pressing the tape 9 onto the tube liner 5.

A further tape layer may be wound onto the tube liner 5 on top of the tape layer already present on the tube liner 5. For example, a further manufacturing station 2 may be provided downstream of the manufacturing station 2. Also, when the reel 3 is free of the tube liner 5 and the tube 6 is coiled onto the reel 4, the reels 3, 4 may be exchanged and the process can start anew. The tube can then be translated a further time in a further translation step through the manufacturing station 2. A further tape layer is then wound on top of the present tape layer when processing the tube liner 5 again through the manufacturing station 2. Many tape layers may be wound onto the tube liner 5, for example up to 40 tape layers or more may be wound until the desired thickness has been reached for obtaining the end product.

Preferably each tape layer is consolidated individually, and a further tape layer is wound after consolidation of the previous tape layer, e.g. by translating the tube a further time through the manufacturing station. Alternatively and/or additionally a few, maximum six, tape layers may be wound and may be consolidated together, contrary to the prior art wherein all tape layers are wound in advance and consolidated at once.

Many variants will be apparent to the person skilled in the art. It is to be understood that the pressure body can have various embodiments, e.g. comprising rollers, carriages, expandable fluid bodies etc. It is to be understood that the heat body can have various embodiments, comprising direct heating or indirect heating, such as heating by gas, hot air, infrared, induction, microwave, etc. All variants are understood to be comprised within the scope of the invention as defined in the following claims.

The invention claimed is:

1. Method for manufacturing a thick-walled multi-layer, continuous composite tube comprising:
    translating a tube liner through a manufacturing station wherein the manufacturing station comprises a separate winding station and a separate consolidation station located at a distance downstream of the winding station;
    winding a composite tape on the tube liner at the winding station for forming a tape layer;
    consolidating the composite tape layer on the tube liner at a consolidation zone of the consolidation station by simultaneously pressing and heating the tape layer over an axial length and at least a circumferential part of the tube liner at the same location with a heated pressure body, while the tube liner is being translated, wherein the heated pressure body is heated and simultaneously provides contact heating for heat transfer of sufficient heat to fuse the composite tape to the composite tube and applies pressure to the composite tube and wherein no other pre-heating heat source of sufficient heat to fuse the composite tape is provided between the winding station and the simultaneous pressing and heating sufficient to fuse the composite tape at the consolidation station;
    translating the tube a further time through at least one of the manufacturing station or another such manufacturing station for winding and consolidating a further tape layer onto a previously wound and consolidated tape layer; and
    repeating the translating, winding and consolidating steps at the manufacturing station to form a thick-walled multi-layer, continuous composite tube of a desired thickness.

2. Method according to claim 1, further comprising cooling the tape downstream the consolidation of the tape by providing a cooling zone downstream the consolidation zone.

3. Method according to claim 1, further comprising consolidating the tape layer in multiple consolidation zones in the consolidation station, wherein in each consolidation zone the tape is simultaneously pressed and heated at the same location by a separate heated pressure body.

4. Method according to claim 3, wherein the multiple consolidation zones are mutually different in at least the provided pressure and/or temperature.

5. Method according to claim 1 wherein the winding occurs with approximately no pretension.

* * * * *